W. ENSELE.
PEACH PITTING MACHINE.
APPLICATION FILED JUNE 11, 1921.

1,403,852.

Patented Jan. 17, 1922.
4 SHEETS—SHEET 3.

Inventor
William Ensele
By Arthur L. Slee
Atty

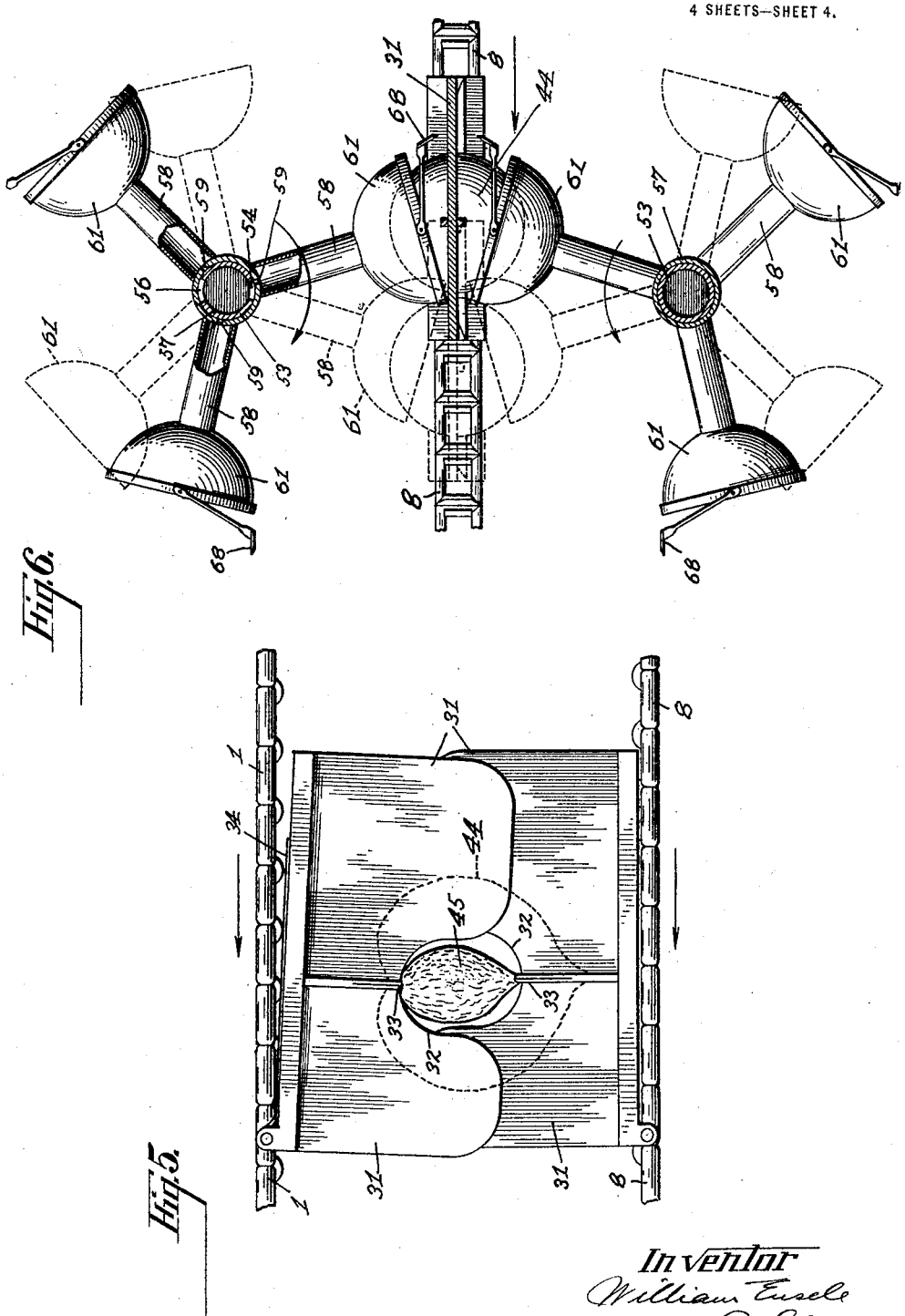

UNITED STATES PATENT OFFICE.

WILLIAM ENSELE, OF GRENADA, CALIFORNIA.

PEACH-PITTING MACHINE.

1,403,852. Specification of Letters Patent. Patented Jan. 17, 1922.

Application filed June 11, 1921. Serial No. 476,905.

*To all whom it may concern:*

Be it known that I, WILLIAM ENSELE, a citizen of the United States, residing in the town of Grenada, in the county of Siskiyou and State of California, have invented a new and useful Improvement in a Peach-Pitting Machine, of which the following is a specification.

My invention relates to improvements in pitting machines for peaches and the like, wherein knives mounted upon parallel conveyors operate in conjunction with suction cups to remove the skin from a peach and to separate the fruit from the pit.

The primary object of my invention is to provide improved means for removing the pit from peaches and other similar fruit.

Another object of my invention is to provide an improved pitting machine arranged to remove the skin from the fruit and to separate the fruit from the pit by a single operation.

A further object of my invention is to provide improved means for engaging the pit within a peach to facilitate the removal of the skin from the peach and the separation of the fruit from the pit.

I accomplish these and other objects by means of the device disclosed in the drawings forming a part of the present specification wherein like characters of reference are used to designate similar parts throughout said specification and drawings, and in which:

Fig. 5 is an enlarged detail of the peach cutting elements and pit engaging means.

Fig. 6 is a broken enlarged detail of my improved skin removing and fruit separating means.

Figure 1:
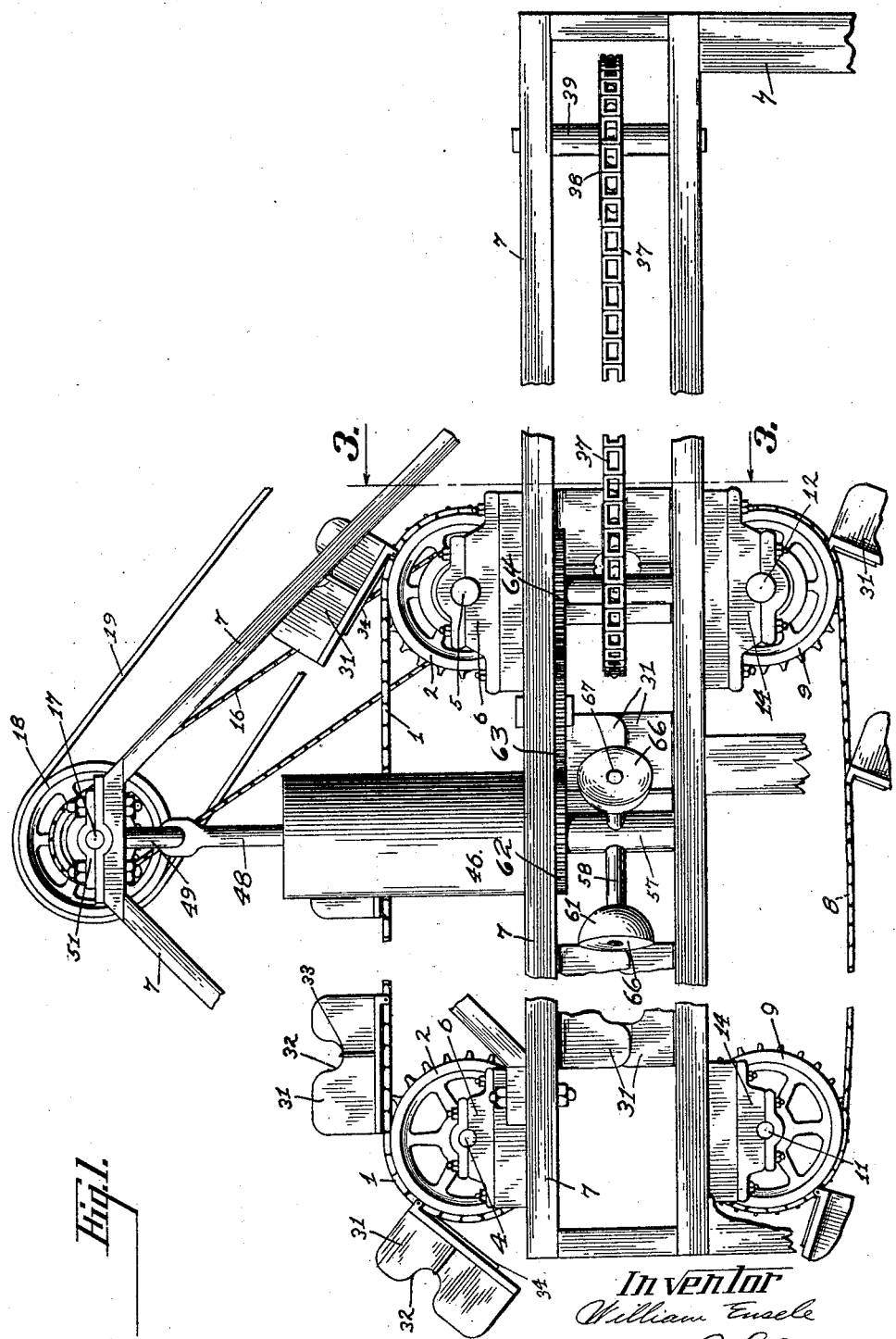
Fig. 1 is a broken side elevation of my improved peach pitting machine.
Figure 2:
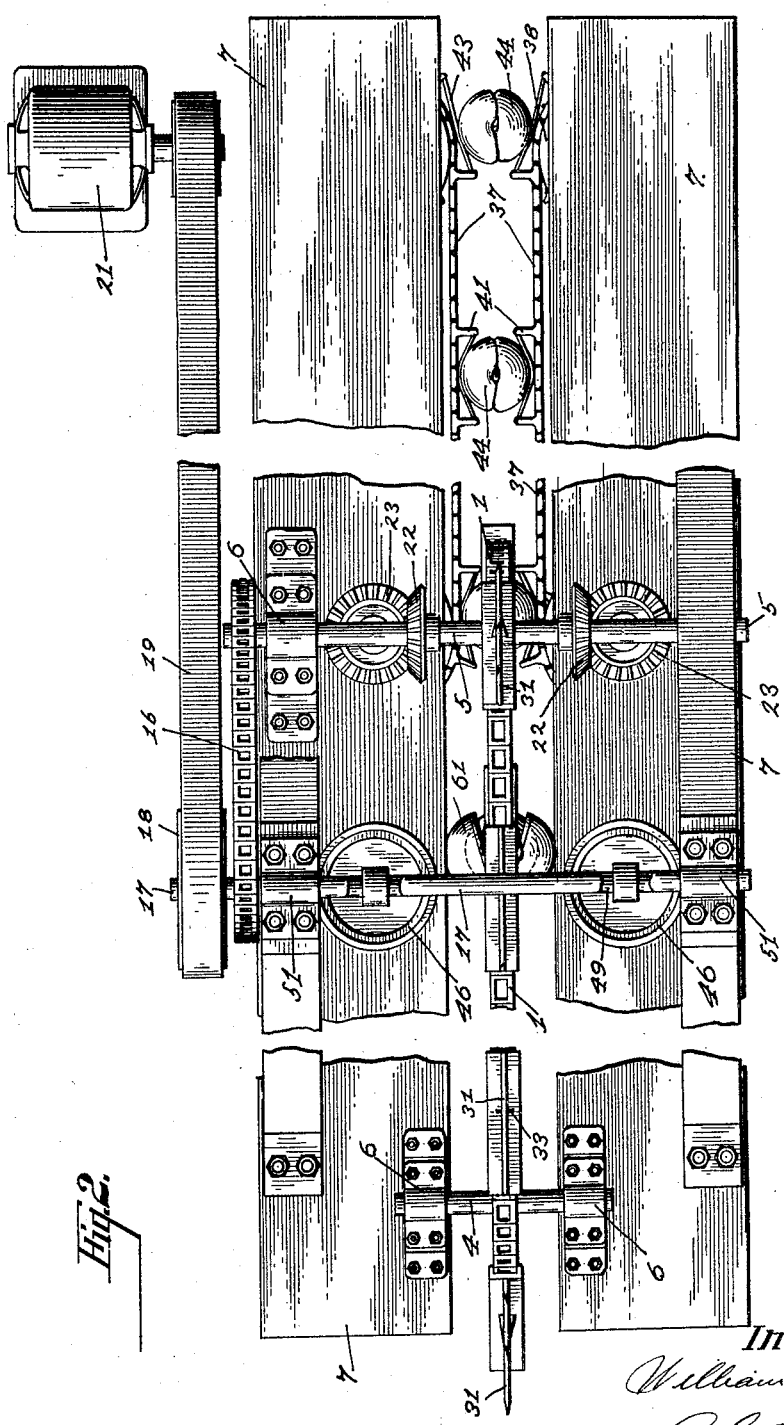
Fig. 2 is a broken plan view of the machine disclosed in Fig. 1.

Referring to the drawings the numeral 1 is used to designate an endless conveyor chain carried by a pair of sprockets 2 mounted upon transverse horizontally disposed shafts 4 and 5 supported in suitable bearings 6 upon a frame 7. A conveyor 8 similar to the conveyor 1 is carried parallel and in spaced relation thereto by sprockets 9 mounted upon shafts 11 and 12 parallel to the shafts 4, and 5 respectively, and supported by bearings 14 secured to the frame 7. The shaft 5 is driven by a chain 16 from a shaft 17 provided with a pulley 18 connected by a belt 19 to a motor 21 or other suitable source of power.

The shaft 5 is provided with a pair of bevel gears 22 meshing with similar bevel gears 23 secured upon the upper ends of a pair of vertically disposed shafts 24. Bevel gears 26 secured upon the lower ends of the shafts 24 mesh with gears 27 mounted upon the shaft 12.

A plurality of knives 31 are pivotally secured to the conveyors 1 and 8 and positioned in such a manner that the knives upon the conveyor 1 will match with the knives upon the conveyor 8. The knives 31 are provided with concave recesses 32 the recess 32 of each knife matching with the recess 32 of the corresponding knife upon the other conveyor. Gripping edges 33 are formed upon the knives 31 at the inner end of the recesses 32.

The shafts 24 drive the sprockets 9 in a direction opposite to the rotation of the sprockets 2 so that the adjacent portions of the conveyors 1 and 8 move in the same direction. The conveyors 1 and 8 are spaced to cause the knives 31 carried thereon to be brought into proximate matching position and to be advanced in such matching position along a common path.

Springs 34 are mounted upon the conveyors 1 and 8 adjacent the knives 31 to normally move the free end of each knife away from the conveyor for a purpose hereinafter more fully described.

The shafts 24 are provided with sprocket wheels 36 arranged to receive a pair of parallel endless conveyors 37 moving in a plane at right angles to and midway between the conveyors 1 and 8, the conveyors 37 being carried by the sprockets 36 and similar sprocket wheels 38 secured upon vertically disposed shafts 39 mounted upon the end of the frame 7 remote from the conveyors 1 and 8.

Arms 41 are secured to the conveyors 37 in matching pairs and arranged to receive pins 42 removably secured thereto over which elastic bands 43 are placed, to engage and retain a peach 44 therebetween while said peach is conveyed and delivered to the knives 31 in a manner hereafter more fully described.

Figure 3:
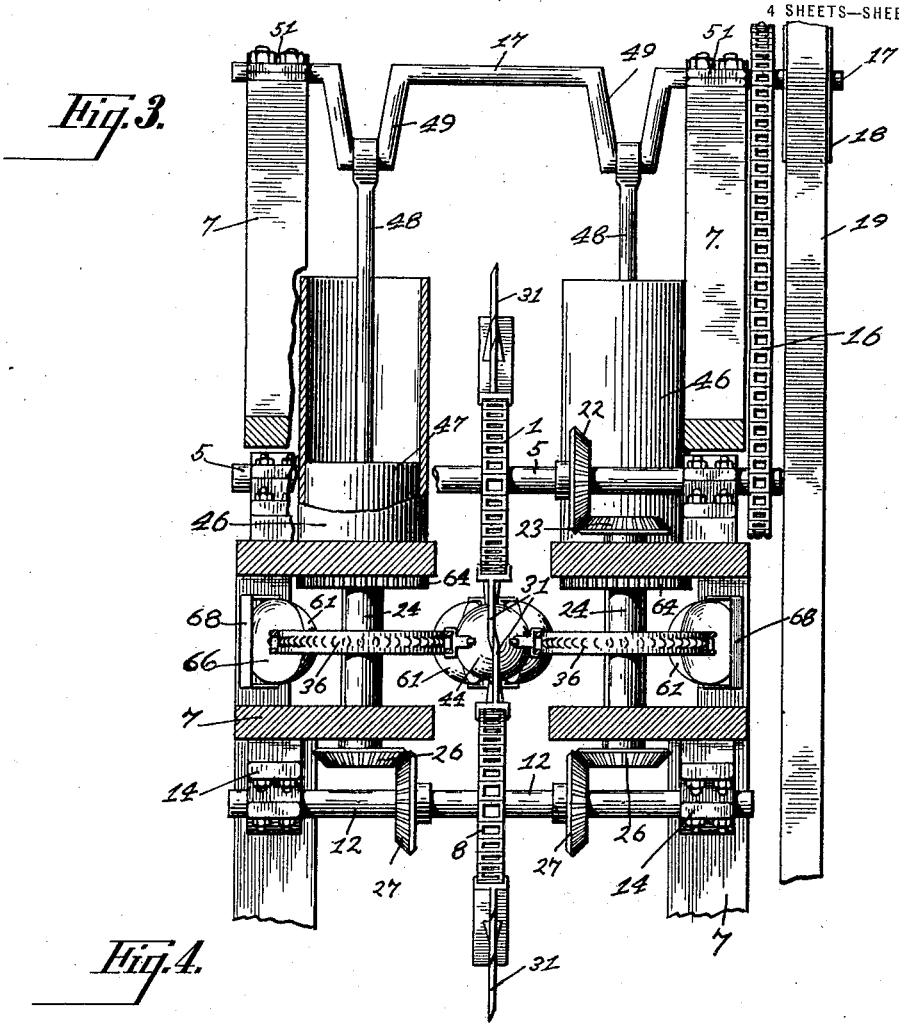
Fig. 3 is a broken transverse section taken along the line 3—3 of Fig. 1 in the direction indicated.
Figure 4:
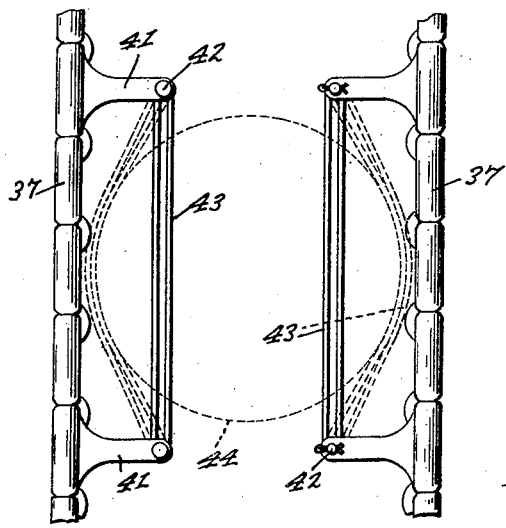
Fig. 4 is an enlarged detail of portions of the peach delivering conveyors disclosing the peach engaging means thereon.

A pair of reciprocating air pumps 46 are mounted upon the frame 7, the pumps 46 being provided with pistons 47 having piston rods 48 connected to cranks 49 formed upon the shaft 17 which is supported upon suitable bearings 51 mounted upon an elevated portion of the frame 7 as best illustrated in Fig. 3 of the drawings. The pumps 46 communicate with hollow shafts 53 mounted at the bottom thereof and provided with intake vents 54 and exhaust vents 56 upon opposite sides of the shafts 53. Sleeves 57 are rotatably mounted upon the shafts 53, each sleeve being provided with a plurality of hollow radial arms 58 communicating with the vents 54 and 56 through ports 59 of relatively small diameter. Semi-spherical suction cups 61 are mounted upon the outer ends of the arms 58.

The sleeves 57 are provided with spur gears 62 meshing with idler gears 63 in turn meshing with gears 64 mounted upon the shafts 24 whereby the sleeves 57 may be rotated to revolve the cups 61 about the hollow shaft 53 in opposite directions at a speed timed to bring a cup 61 adjacent each side of each pair of knives 31 as said knives are successively advanced thereby.

The outer portion of the cups 61 are closed by an elastic cover 66 having a relatively small vent 67 therein, which acts as an intake when the pumps 46 make a suction stroke and as an exhaust vent when each pump makes a pressure stroke. Spring knives 68 are secured upon the outer edge of the cups 61 to separate a peach from its pit in a manner hereafter described.

The operation of my invention is as follows:

Power being applied through the belt 19 to operate the conveyors as above described, an operator places peaches in position to be engaged by the elastic bands 43, as corresponding bands upon the conveyors 37 are moved into adjacent positions around the sprocket wheels 38, the peach being firmly retained between the bands and advanced by the conveyor into a position to be engaged by a pair of matching knives 31 upon the conveyors 1 and 8 as said knives are moved into proximate matching positions around the sprocket wheels 2 and 5, the pairs of arms 42 being spaced along the conveyors 37 at the same distance as the knives 31 are spaced upon the conveyors 1 and 8, and timed to deliver a peach into position to be engaged by the knives at the moment each pair of knives move into matching position.

The peaches 44 are preferably supplied to the conveyors 37 with the split in alignment with the knives 31 and the pit 45 in a substantially vertical position so that when the knives 31 close over a peach into matching position, the recesses 32 will encompass the pit and the gripping edges 33 be moved into engagement with the ends of the pit 45 and held in gripping contact therewith by the springs 34, the walls of the peach being cut through by the knives along the split of the peach. The knives 31 are arranged to engage the peach just prior to its release from the elastic bands 43 as said bands are receded from each other around the sprocket wheels 36, the advance of the peach being uninterrupted.

The suction cups 61 revolving about the hollow shafts 53 are timed to move in pairs into contact with each peach 44 as the peaches gripped between the knives 31 are moved successively therebetween by the conveyors 1 and 8, the cups closing over opposite sides of a peach and forming a close contact between the peach and the elastic covers 66. The pumps 46 are timed to make a suction stroke while the cups 61 are in contact with a peach, connection being made between the pump 46 and the cups 61 through the hollow shaft 53, the vents 54 and 56, and the arms 58, so that the vacuum formed will draw the peach skin firmly against the cover 66. As the cups 61 revolve past the peach, a pulling force combined with a slight twisting movement is exerted which operates to loosen the skin and remove the skin from the peach, the peach being held firmly between the knives 31.

In Fig. 6 of the drawings I have illustrated the operation of the suction cups. In the form shown I employ three cups 61 equally spaced upon each shaft 53, the direction in which the cups revolve and the movement of the peach carried by the conveyers 1 and 8 being indicated by arrows. As the peach 44 is advanced by the conveyors one pair of the cups 61 move into contact with the sides of the peach as indicated in full lines. The intake vents 54 are arranged upon the inner side of the shaft 53 and occupy substantially one sixth of the circumference of the shaft, the vent being centered upon a line between the two shafts 53. The pumps 46 are timed to make a suction stroke during the time the port 59 communicating with the cup 61 through its arm 58 is in operative relation with the vent 54, in this manner causing a suction to be exerted upon the skin of the peach in the manner above described. The port 59 passes out of engagement with the vent 54 at the end of the suction stroke of the pump.

While the ports 59 communicating with the operative pair cup 61 opens into the shaft 53, the ports 59 communicating with the remaining pairs of cups remain closed, thereby preventing the entrance of air therethrough. At the moment the ports 59 pass out of engagement with the vents 54 at the end of the suction stroke, ports 59 communicating with the next preceding pair of cups move into engagement with the exhaust vents 56 which are formed in the side of the shafts 53 opposite to the intake vents 54. In this manner the exhaust from the pressure stroke of the pump 46 will be directed outwardly through the cup 61 most remote from the conveyors, the pressure operating to dislodge the skin from the cup and expel the same in a direction away from the machine. The pumps 46 make three suction strokes and three pressure strokes to each revolution of the cups, thereby alternately creating a vacuum to hold the skin against the cup while adjacent a peach, and to create a pressure to dislodge the skin from the cup when it has moved to a point remote from the conveyors.

As the peach 44 and the cups 61 are advanced into the position indicated in dotted lines in Fig. 6 of the drawings the spring knives 68 mounted upon the cups are brought into contact with the knives 31 and the relative movement is such that the edge of the knives 68 will be moved forward between the portions of the peach and the knives 31 so that as the cups 61 are further revolved the portions of the peach upon opposite sides of the knives 31 will be separated from the pit 45 and fall away from the knives to be received in any suitable container, the pit 45 being gripped between the knives 31 and carried on to the end of the conveyors 1 and 8 to be delivered into a container or to refuse conveyor.

While I have illustrated and described my invention as relating to the pitting of peaches, the machine is equally adapted for use with prunes, apricots and other similar fruits. The form of construction of my invention may be varied to meet varied conditions and the form and proportion of the several elements altered to meet the requirements of different grades and characters of fruits without departing from the spirit of my invention. I, therefore, do not limit myself to the precise construction illustrated but wish to avail myself of all modifications falling within the scope of the appended claims.

Having thus described my invention what I claim as new and desire to secure by Letters Patent is:

1. A peach pitting machine comprising a plurality of cutting elements arranged to sever a peach and grip the pit therein; means for delivering peaches to the cutting elements; means engaging the surface of the peach to remove the skin therefrom; and means for separating the peach from the pit while said pit is retained by the cutting means.

2. A peach pitting machine comprising a plurality of cutting elements arranged in pairs to sever a peach to grip the pit therein; means for delivering peaches to the cutting elements; means engaging the surface of the peach to remove the skin therefrom; and means for separating the peach from the pit while said pit is retained between the cutting elements.

3. A peach pitting machine comprising a plurality of cutting elements arranged in pairs to sever a peach to engage the pit therein; suction means engaging the surface of the peach for removing the skin therefrom; and means for separating the peach from the pit.

4. A peach pitting machine comprising a plurality of cutting elements arranged in pairs to sever a peach and grip the pit therein; means for delivering peaches to said cutting elements; suction means engaging the surface of the peach for removing the skin therefrom; and means mounted upon said suction means and operating in conjunction therewith for separating the severed peach from the pit while said pit is retained between the cutting elements.

5. A peach pitting machine comprising a plurality of cutting elements arranged in pairs to sever a peach and grip the pit therein; means for delivering peaches to the cutting elements; suction means revolvably mounted adjacent the cutting elements and arranged to engage the surface of the peach for removing the skin therefrom; and means mounted upon said suction means to engage the peach and separate the severed portions thereof from the pit.

6. A peach pitting machine comprising a plurality of cutting elements arranged in pairs to sever a peach and grip the pit therein; means for delivering peaches to said cutting elements; a plurality of suction cups revolvably mounted adjacent the cutting elements and arranged to engage the surfaces of the peach upon opposite sides of said cutting elements and remove the skin therefrom; and means mounted upon said suction cups to engage the peach and separate the severed portions thereof from the pit.

7. A peach pitting machine comprising a plurality of cutting elements arranged in pairs to sever a peach and engage the pit therein; means for delivering peaches to said cutting elements; a plurality of suction cups revolvably mounted adjacent the cutting elements and arranged to engage the surfaces of the peach upon opposite sides of the cutting elements; means for creating a vacuum within the suction cups to hold the skin of the peach thereagainst whereby the revolving of the cup operates to remove said skin from the peach; and means for separating the severed portions of the peach from the pit while said pit is retained between the cutting elements.

8. A peach pitting machine comprising a plurality of cutting elements arranged in pairs to sever a peach to grip the pit therein; means for delivering peaches to said cutting elements; a plurality of suction cups revolvably mounted adjacent the cutting elements and arranged to engage the surface of the peach upon opposite sides of said cutting elements; pumps operatively connected to said suction cups to create a vacuum therein while said cups are in contact with the peach to draw and hold the skin of said peach against the cup, whereby movement of said cup away from the peach operates to remove said skin from the peach; and means for separating the severed portions of the peach from the pit while said pit is retained between the cutting elements.

9. A peach pitting machine comprising a plurality of cutting elements arranged in pairs to sever a peach to grip the pit therein; means for delivering peaches to the cutting elements; a plurality of suction elements revolvably mounted adjacent the cutting elements and arranged to engage the surface of the peach upon opposite sides of said cutting elements; reciprocating pumps operatively connected to said suction cups, and timed to make a suction stroke while said cups are in contact with the peach to draw and hold the skin of said peach against the cup whereby rotation of said cup away from the peach operates to remove said skin from the peach, and to make a pressure stroke when said cups have been rotated away from the peach whereby the pressure from said pump will operate to dislodge the skin from the cups; and means for separating the portions of the peach from the pit.

10. A peach pitting machine comprising a pair of parallel conveyors; a plurality of cutting elements mounted upon said conveyors, the elements upon one conveyor matching with corresponding elements upon the other conveyor; means for operating said conveyors to move the adjacent sides thereof in the same direction along a common path; means for delivering peaches to the cutting elements as corresponding elements are moved into matching relation, said cutting elements severing a peach to grip the pit therein and to advance said peach and pit along the path of the conveyor; a plurality of suction cups revolvably mounted adjacent the conveyors and arranged to engage the surfaces of a peach upon opposite sides of the cutting elements; reciprocating pumps operatively connected to the suction cups and timed to make a suction stroke while said cups are in contact with the peach to draw and hold the skin of said peach against the cup whereby movement of said cup away from the peach operates to remove said skin from the peach, and to make a pressure stroke when said cups have been moved away from the peach whereby the pressure from said pump will operate to dislodge the skin from the cups; and means for separating the severed portions of the peach from the pit while said pit is retained between the cutting elements.

11. A peach pitting machine comprising a pair of parallel conveyors; a plurality of cutting elements mounted upon said conveyors, the elements upon one conveyor matching with corresponding elements upon the other conveyor; means for operating said conveyors to move the matching cutting elements along a common path; a pair of conveyors mounted adjacent one end of the first mentioned conveyors to deliver peaches to the cutting elements thereon as corresponding elements are moved into matching position, said cutting elements severing a peach to grip the pit therein and to advance said peach and pit along the path of said elements; springs operatively mounted upon the cutting elements to hold said elements in gripping relation with the peach pit; suction cups revolvably mounted adjacent the path of the cutting elements arranged to engage the surfaces of the peach upon oposite sides of the cutting elements to remove the skin from the peach; and means for separating the portions of the peach upon opposite sides of the cutting elements from the peach pit while said pit is retained between said cutting elements.

12. A peach pitting machine comprising a pair of parallel conveyors; a plurality of cutting elements mounted upon said conveyors, the elements of one conveyor matching with corresponding elements upon the other conveyor; means for operating said conveyors to move the matching cutting elements along a common path; a pair of conveyors mounted adjacent one end of the first mentioned conveyors to deliver peaches to the cuttng elements thereon as corresponding elements are moved into matching position, said elements cutting through the walls of a peach to grip the pit therein and advancing said peach and pit along the path of the elements; springs mounted upon the cutting elements to retain said elements in gripping engagement with the pit, a plurality of suction cups revolvably mounted adjacent the path of the cutting elements and arranged to engage the surfaces of the peach upon opposite sides of said elements; reciprocating pumps operatively connected to the suction cups and timed to make a suction stroke while said cups are in contact with a peach to draw and hold the skin of said peach against the cup whereby movement of said cup away from the peach operates to remove said skin from said peach, and to make a pressure stroke when the cups have been moved away from the peach whereby pressure from the pump operates to dislodge the skin from the cups; and means for separating the portions of the peach upon opposite sides of the cutting elements from the pit while said pit is retained between said cutting elements.

13. A peach pitting machine comprising a pair of parallel conveyors; a plurality of cutting elements mounted upon said conveyors, the elements of one conveyor matching with corresponding elements upon the other conveyor; means for operating said conveyors to move the matching cutting elements along a common path; a pair of conveyors mounted adjacent one end of the first mentioned conveyors to deliver peaches to the cutting elements thereon as corresponding elements are moved into matching position; said elements cutting through the walls of a peach to grip the pit therein and advancing said peach and pit along the path of the elements; springs mounted upon the cutting elements to retain said elements in gripping engagement with the pit; a plurality of suction cups revolvably mounted adjacent the path of the cutting elements and arranged to engage the surfaces of the peach upon opposite sides of said elements; reciprocating pumps operatively connected to the suction cups and timed to make a suction stroke while said cups are in contact with a peach to draw and hold the skin of said peach against the cup whereby movement of said cup away from the peach operates to remove said skin from said peach, and to make a pressure stroke when the cups have been moved away from the peach whereby pressure from the pump operates to dislodge the skin from the cups; means for separating the portions of the peach upon opposite sides of the cutting elements from the pit while said pit is retained between said cutting elements; and spring knives mounted upon said suction cups to engage the peach when said cups revolve away therefrom for separating the portions of the peach upon opposite sides of the cutting elements from the pit while said pit is retained between said elements.

14. In a peach pitting machine of the character described, a plurality of suction cups revolvably mounted upon opposite sides of a peach engaging means and arranged to engage the surfaces of a peach held in said engaging means; a pair of reciprocating pumps connected to said cups and timed to make a suction stroke while each cup is in contact with a peach and to make a pressure stroke when said cup has revolved away from the peach.

15. In a peach pitting machine of the character described, a pair of reciprocating pumps; hollow shafts connected to said pump, said shafts having oppositely positioned intake and exhaust vents; a sleeve rotatably mounted upon each hollow shaft; laterally extending hollow arms secured to each sleeve and having ports opening thereinto to communicate with the intake and exhaust vents; a suction cup mounted upon the outer end of each lateral arm; means for rotating the sleeves upon the hollow shafts to revolve the suction cups; and means for operating the pumps in timed relation with the revolving of the cups whereby a suction may be created independently within each of said cups for one portion of each revolution and a pressure exhausted through each of said cups during another portion of said revolution.

16. In a peach pitting machine of the characters described, a plurality of revolvably mounted suction cups; a spring knife mounted upon each cup; and means for revolving said cups into contact with a peach to remove the skin therefrom and to separate the peach from the pit.

17. In a peach pitting machine of the character described, a pair of parallel conveyors; knives mounted in matching positions upon said conveyors, said knives having matching concave recesses adapted to encompass a peach pit; and means for holding said knives in gripping engagement with said pit.

18. In a peach pitting machine of the character described, a pair of parallel conveyors; knives mounted in matching positions upon said conveyors, said knives having matching recesses arranged to encompass and engage a peach pit; gripping edges formed transversely upon said knives at the inner end of said recesses; and means for holding said knives and gripping edges in gripping engagement with a pit.

19. In a peach pitting machine of the character described, a pair of parallel conveyors; knives mounted in matching positions upon said conveyors, said knives having matching recesses arranged to encompass and engage a peach pit; gripping edges formed transversely upon said knives at the inner end of said recesses; a spring mounted upon the conveyor and bearing against the knives to hold said knives and the gripping edges thereon in gripping engagement with a peach pit.

In witness whereof I hereunto set my signature.

WILLIAM ENSELE.